US010148044B2

(12) United States Patent
Urrea et al.

(10) Patent No.: US 10,148,044 B2
(45) Date of Patent: Dec. 4, 2018

(54) BATTERY TERMINAL FUSE MODULE (71) Applicant: Littelfuse, Inc., Chicago, IL (US)

(72) Inventors: Julio Urrea, Hudson, OH (US); Gary Bold, Palantine, IL (US); Hector Perez, Coahuila (MX)

(73) Assignee: Littelfuse, Inc., Chicago, IL (US)

( * ) Notice: Subject to any disclaimer, the term of this patent is extended or adjusted under 35 U.S.C. 154(b) by 0 days.

(21) Appl. No.: 15/832,477

(22) Filed: Dec. 5, 2017

(65) Prior Publication Data

US 2018/0205188 A1 Jul. 19, 2018

Related U.S. Application Data

(60) Provisional application No. 62/430,168, filed on Dec. 5, 2016.

(51) Int. Cl.
| | |
|---|---|
| *H01R 13/68* | (2011.01) |
| *H01R 13/684* | (2011.01) |
| *H01M 2/34* | (2006.01) |
| *H01H 85/165* | (2006.01) |

(52) U.S. Cl.
CPC ......... *H01R 13/684* (2013.01); *H01H 85/165* (2013.01); *H01M 2/34* (2013.01); *H01H 2231/024* (2013.01); *H01R 2201/26* (2013.01)

(58) Field of Classification Search
CPC ..... H01R 13/68; H01R 11/281–11/289; H01H 85/2035; H01H 2085/208
USPC ....... 439/620.26, 620.27, 754–774; 337/189, 337/158, 159, 161, 188, 229, 256, 290, 337/278
See application file for complete search history.

(56) References Cited

U.S. PATENT DOCUMENTS

| | | | | |
|---|---|---|---|---|
| 5,643,693 A | * | 7/1997 | Hill ..................... | H01M 2/1083 429/121 |
| 6,642,633 B1 | * | 11/2003 | Yang ................... | H01M 2/1083 307/10.1 |
| 7,990,738 B2 | * | 8/2011 | Urrea .................... | H01H 85/12 361/833 |
| 2009/0251200 A1 | * | 10/2009 | Urrea .................... | H01H 85/12 327/525 |
| 2010/0019572 A1 | * | 1/2010 | Kudo ................... | H01H 85/044 307/10.7 |
| 2015/0236436 A1 | * | 8/2015 | Freitag ................. | H01R 11/287 439/763 |

(Continued)

*Primary Examiner* — Gary Paumen (57) ABSTRACT

A fuse module including an battery clamp, a fuse assembly including a mounting block, a bus bar on a first side of the mounting block in contact with the battery clamp, fuse terminals on a second side of the mounting block connected to the bus bar by fusible elements, and a terminal post extending through one of the fuse terminals for facilitating electrical connection to a first electrical component, the fuse module further including a mounting cradle holding the fuse assembly and the battery clamp, the mounting cradle including a mounting post extending through the battery clamp, the bus bar, the mounting block, and one of the fuse terminals for facilitating connection to a second electrical component and for securing the fuse module components together, wherein the mounting post is surrounded by a tubular sleeve extending between the bus bar and the fuse terminal through which the mounting post extends.

20 Claims, 6 Drawing Sheets

(56) References Cited

U.S. PATENT DOCUMENTS

2015/0325934 A1* 11/2015 Freitag ................ H01R 11/287
439/763

* cited by examiner

BATTERY TERMINAL FUSE MODULE

CROSS-REFERENCES TO RELATED APPLICATIONS

This application claims the benefit of U.S. Provisional Patent Application No. 62/430,168, filed Dec. 5, 2016, which is incorporated by reference herein in its entirety.

FIELD OF THE DISCLOSURE

The disclosure relates generally to the field of circuit protection devices, and relates more particularly to a battery terminal fuse module suitable for automotive battery applications.

BACKGROUND OF THE DISCLOSURE

In the global automotive market there has been a trend toward implementing so-called "pre-fuse boxes" disposed within automobile engine compartments and connected to automobile battery terminals. The main purpose of a pre-fuse box in an automobile is to prevent electrical damage that may result from short-circuiting in high-current-conducting wires that may occur in the event of an accident.

Existing pre-fuse boxes are typically quite large and are mounted adjacent automobile batteries with flexible, conductive leads providing electrical connections therebetween. This configuration requires a great deal of space within an automobile engine compartment where space is already very limited.

It is with respect to these and other considerations that the present improvements may be useful.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

A fuse module in accordance with an exemplary embodiment of the present disclosure may include an battery clamp, a fuse assembly including a mounting block, a bus bar on a first side of the mounting block in contact with the battery clamp, fuse terminals on a second side of the mounting block connected to the bus bar by fusible elements, and a terminal post extending through one of the fuse terminals for facilitating electrical connection to a first electrical component, the fuse module further including a mounting cradle holding the fuse assembly and the battery clamp, the mounting cradle including a mounting post extending through the battery clamp, the bus bar, the mounting block, and one of the fuse terminals for facilitating connection to a second electrical component and for securing the fuse module components together, wherein the mounting post is surrounded by a tubular sleeve extending between the bus bar and the fuse terminal through which the mounting post extends.

Another fuse module in accordance with an exemplary embodiment of the present disclosure may include an electrically conductive battery clamp having a ferrule portion adapted for connection to a battery terminal and further having a terminal portion extending from the ferrule portion, a fuse assembly comprising, a mounting block formed of an electrically insulating material, an electrically conductive bus bar disposed on a first side of the mounting block in contact with the terminal portion of the battery clamp, a plurality of fuse terminals disposed on a second side of the mounting block opposite the first side and connected to the bus bar by respective fusible elements extending along a third side of the mounting block, an electrically conductive terminal post extending through one of the fuse terminals for facilitating connection to a first electrical component, and an electrically conductive bus extension mechanically joined to the bus bar for facilitating connection to a fuse, wherein the bus extension differs from the bus bar with respect to at least one of material and thickness, the fuse module further including a mounting cradle holding the terminal portion of the battery clamp and the fuse assembly, the mounting cradle including a mounting post extending through the terminal portion of the battery clamp, the bus bar, the mounting block, and one of the fuse terminals for facilitating connection to a second electrical component and for securing the battery clamp, the fuse assembly, and the mounting cradle together in a stacked arrangement, wherein the mounting post is surrounded by a tubular sleeve that extends between the bus bar and with the fuse terminal through which the mounting post extends.

DETAILED DESCRIPTION

A battery terminal fuse module in accordance with the present disclosure will now be described more fully with reference to the accompanying drawings, in which preferred embodiments of the battery terminal fuse module are presented. It will be understood, however, that the battery terminal fuse module may be embodied in many different forms and should not be construed as being limited to the embodiments set forth herein. Rather, these embodiments are provided so that this disclosure will convey certain exemplary aspects of the battery terminal fuse module to those skilled in the art. In the drawings, like numbers refer to like elements throughout unless otherwise noted.

Figure 1:
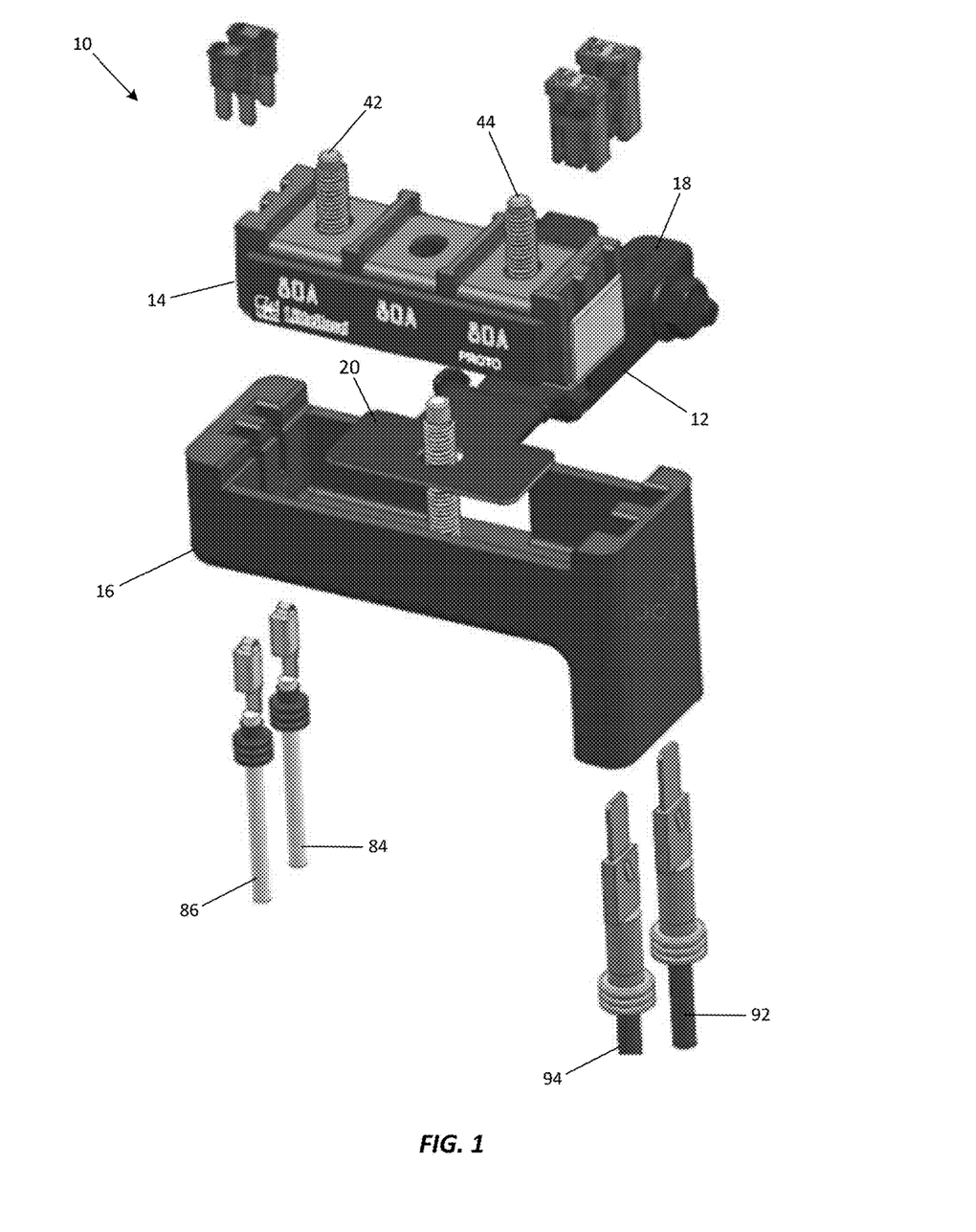
FIG. 1 is an exploded perspective view illustrating a fuse module in accordance with an exemplary embodiment of the present disclosure.

Referring to FIG. 1, an exploded view of a battery terminal fuse module 10 (hereinafter "the fuse module 10") in accordance with an exemplary, non-limiting embodiment of the present disclosure is shown. As will be described in greater detail below, the fuse module 10 may be coupled directly to a positive terminal of an automobile battery with no flexible electrical conductors extending therebetween, and may facilitate connection to a plurality of low and medium-current fuses for protecting a variety of electrical loads (e.g., an air conditioning unit, a stereo, etc.) that are powered by the automobile battery. Advantageously, the fuse module 10 includes an integrated mounting structure that allows the fuse module 10 to be implemented in a compact, space-saving form factor relative to pre-fuse boxes that are currently available on the market.

For the sake of convenience and clarity, terms such as "front," "rear," "top," "bottom," "up," "down," "vertical," and "horizontal" may be used herein to describe the relative placement and orientation of various components of the fuse module 10, each with respect to the geometry and orientation of the fuse module 10 as it appears in FIG. 1. Said terminology will include the words specifically mentioned, derivatives thereof, and words of similar import.

The fuse module 10 may include a battery clamp 12, a fuse assembly 14, and a mounting cradle 16 that may be coupled together in a vertically stacked arrangement as further described below. The battery clamp 12 may be formed of metal or any other suitably rigid, electrically conductive material and may include a ferrule portion 18 (best shown in FIG. 2) for removably fastening the battery clamp 12 to a positive terminal of an automobile battery. The battery clamp 12 may further include a substantially planar, T-shaped terminal portion 20 that extends generally horizontally from the front of the ferrule portion 18. The terminal portion 20 and the ferrule portion 18 of the battery clamp 12 may be formed from a single piece of material (e.g., stamped from a single sheet of metal) or may be formed from separate pieces of material that are welded, clinched, or otherwise joined together in a manner that provides robust electrical communication therebetween. It is contemplated that a ledge, block, or other support structure may be formed on, or affixed to, an underside of the terminal portion 20 to support the battery clamp 12 against the weight of the cantilevered fuse assembly 14 and mounting cradle 16 to reduce mechanical stress on the connection between the ferrule portion 18 and a battery terminal.

Figure 2:
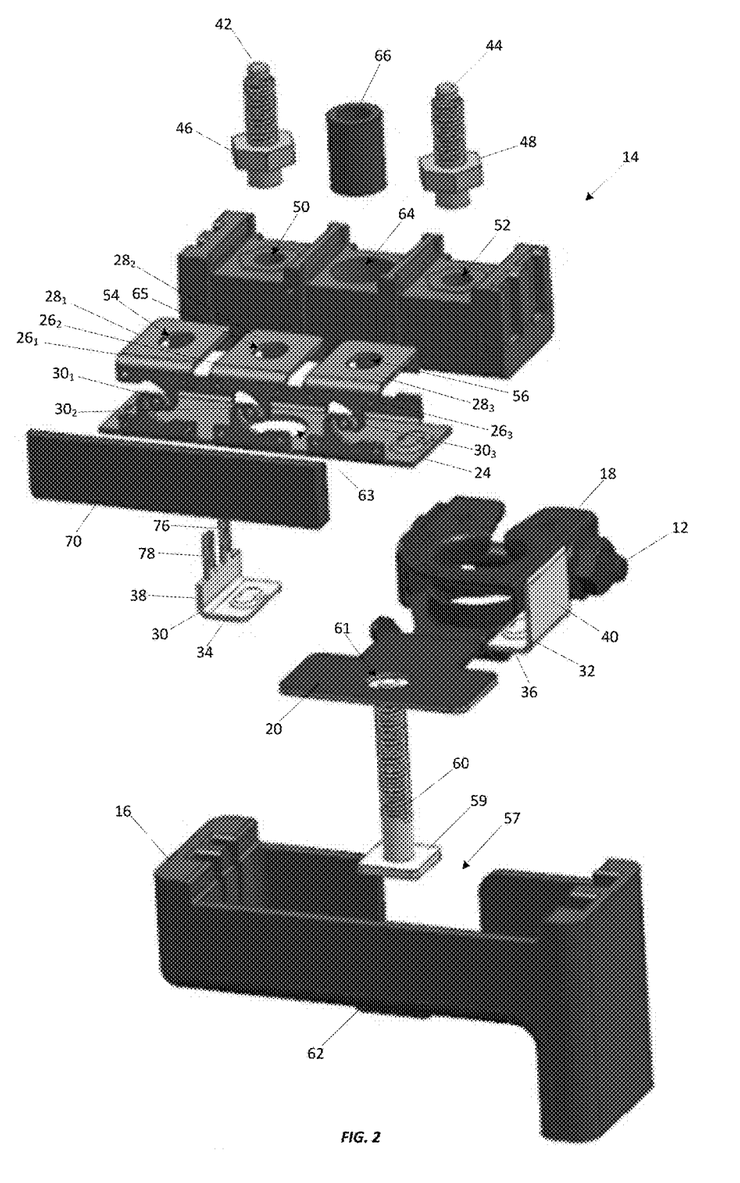
FIG. 2 is an exploded perspective view illustrating a fuse assembly of the fuse module shown in FIG. 1.

Referring now to the exploded view shown in FIG. 2, the fuse assembly 14 may include an elongate mounting block 22 formed of an electrically insulting material (e.g., ceramic, plastic, polymer, etc.). The fuse assembly 14 may further include a substantially planar bus bar 24 formed of an electrically conductive material (e.g., copper) that extends along a bottom surface of the mounting block 22. The bus bar 24 may sit atop the terminal portion 20 of the battery clamp 12 in electrical communication therewith. The fuse assembly 14 may further include a plurality of fuses $26_1$, $26_2$, $26_3$ that include respective fuse terminals $28_1$, $28_2$, $28_3$ disposed on a top surface of the mounting block 22 and connected to the bus bar 24 by respective fusible elements $30_1$, $30_2$, $30_3$ disposed on a vertical face of the mounting block 22. The bus bar 24 and the fuses $26_1$, $26_2$, $26_3$ may be formed from a single piece of conductive material (e.g., stamped from a single sheet of copper) and may be bent or wrapped about the faces of the mounting block 22. In a non-limiting, exemplary embodiment, the bus bar 24 and the fuses $26_1$, $26_2$, $26_3$ may be formed of 1-millimeter-thick copper sheet, and each of the fuses $26_1$, $26_2$, $26_3$ may have a rating of 80 amps. It will be appreciated that the bus bar 24 and the fuses $26_1$, $26_2$, $26_3$ are not limited in this regard, and that the bus bar 24 and the fuses $26_1$, $26_2$, $26_3$ may be formed of various other conductive materials and/or with different thicknesses to achieve different current ratings.

The fuse assembly 14 may further include bus extensions 30, 32 extending from opposing ends of the bus bar 24. Each bus extension 30, 32 may be formed of a segment of sheet metal (e.g., copper sheet) that is bent into a generally L-shape to define respective, horizontally-oriented base portions 34, 36 and respective, vertically-oriented extension terminal portions 38, 40 that extend upwardly alongside the longitudinal end faces of the mounting block 22. The base portions 34, 36 may be clinched, welded, or otherwise joined to the bus bar 24 in a manner that provides robust electrical communication therebetween. In a non-limiting, exemplary embodiment, the bus extensions 30, 32 may be formed of 0.8-millimeter-thick copper sheet (i.e., copper sheet that is thinner than the 1-millimeter-thick bus bar 24 described above) to facilitate connection to fuses having lower amperage ratings (e.g., 5-40 amps) than the fuses $26_1$, $26_2$, $26_3$ described above. The implementation of such lower amperage fuses via the bus extensions 30, 32 will be described in greater detail below.

The fuse assembly 14 may further include electrically conductive terminal posts 42, 44 having respective polygonal flanges 46, 48 extending from their lower ends. The flanges 46, 48 may be seated within respective polygonal bores 50, 52 formed in the top of the mounting block 22 below the fuse terminals $28_1$, $28_3$ of the outermost fuses $26_1$, $26_3$, with the terminal posts 42, 44 extending upwardly through respective apertures 54, 56 formed in the fuse terminals $28_1$, $28_3$ (as shown in FIG. 1). The bores 50, 52 may be of similar size and shape to the flanges 46, 48 and may be configured to matingly receive the flanges 46, 48 in a close-clearance relationship therewith. The flanges 46, 48 may thereby restrict rotation of the terminal posts 42, 44 about their respective vertical axes. The terminal posts 42, 44 may be threaded for allowing ring terminals of conductors (not shown) to be placed over the terminal posts 42, 44 and secured against the fuse terminals $28_1$, $28_3$ with nuts (not shown) that may be tightened onto the terminal posts 42, 44. Thus, various electrical systems or components of an automobile may be electrically coupled to a positive terminal of the automobile's battery via the terminal posts 42, 44, the fuse terminals $28_1$, $28_3$, the fusible elements $30_1$, $30_3$, the bus bar 24, and the battery clamp 12, with the fuses $26_1$, $26_3$ providing over-current protection between the automobile battery and such electrical systems or components.

The mounting cradle 16 may be a generally rectangular, cup-shaped member formed of an electrically insulating material (e.g., plastic, polymer, etc.). The mounting cradle 16 may hold the terminal portion 20 of the battery clamp 12 and the bottom of the fuse assembly 14, substantially covering the front and sides of the fuse assembly 14, with the terminal portion 20 extending through a recess 57 in the rear of the mounting cradle 16. A threaded mounting post 60 may be rigidly attached to, and may extend vertically from, a floor 62 of the mounting cradle 16. In a non-limiting example, a flange 59 extending from a lower end of the mounting post 60 may be overmolded within the floor 62 of the mounting cradle 16. The mounting post 60 may extend upwardly through an aperture 61 in the terminal portion 20 of the battery clamp 12, through an aperture 63 in the bus bar 24, through a bore 64 formed in the mounting block 22, and through an aperture 65 in the fuse terminal $28_2$ of the fuse $26_2$ (see also FIG. 3). Thus, as with the terminal posts 42, 44 described above, a ring terminal of a conductor (not shown) may be placed over the mounting post 60 and secured against the fuse terminal $28_2$ with a nut (not shown) that may be tightened onto the mounting post 60. Additionally, tightening a nut onto the mounting post 60 may secure the mounting cradle 16, the battery clamp 12, and the fuse assembly 14 together in a vertically stacked arrangement. The mounting post 60 may be electrically insulated from the bus bar 24, such as by physical separation and/or electrically insulating material disposed therebetween, to prevent electrical current from bypassing the fusible element $30_2$ and flowing from the bus bar 24 to the fuse terminal $28_2$ via the mounting post 60.

Figure 3:
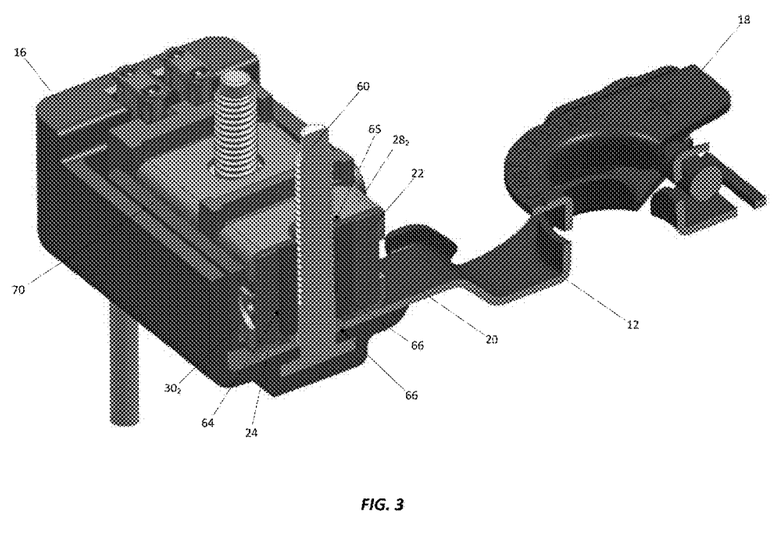
FIG. 3 is lateral cross-sectional view illustrating the fuse assembly shown in FIG. 2.

Referring now to the cross-sectional view of the module 10 shown in FIG. 3, a tubular sleeve 66 may be disposed within the bore 64 in the mounting block 22 and may surround the mounting post 60 vertically intermediate the bus bar 24 and the fuse terminal $28_2$, with a bottom of the sleeve 66 engaging or proximate a top of the bus bar 24 and with a top of the sleeve 66 engaging or proximate a bottom of the fuse terminal $28_2$. In a non-limiting embodiment of the fuse module 10, the sleeve 66 may be formed of metal to provide an electrically-conductive pathway (i.e., a shunt) extending directly between the bus bar 24 and the fuse terminal $28_2$. Such a configuration may be appropriate in applications where it is desirable to bypass the fusible element $30_2$ and provide an unprotected electrical path from an automobile battery through the fuse module 10 to electrical systems/components that may be protected by fuses elsewhere in an automobile. In an alternative embodiment of the fuse module 10, the sleeve 66 may be formed of a non-conductive material (e.g., ceramic, plastic, etc.), whereby the only electrically-conductive path between the bus bar 24 and the fuse terminal $28_2$ is through the fusible element $30_2$.

The fuse assembly 14 may further include a cover 70 that may be affixed to a front of the mounting block 22, such as with mechanical fasteners or structures, adhesives, welding, etc. The cover 70 may be disposed over the fusible elements $30_1$, $30_2$, $30_3$ for protecting the fusible elements $30_1$, $30_2$, $30_3$ from ambient particulate as well as for containing electrical arcing in the fusible elements $30_1$, $30_2$, $30_3$ that may result from blowing during an overcurrent condition.

Figure 4:
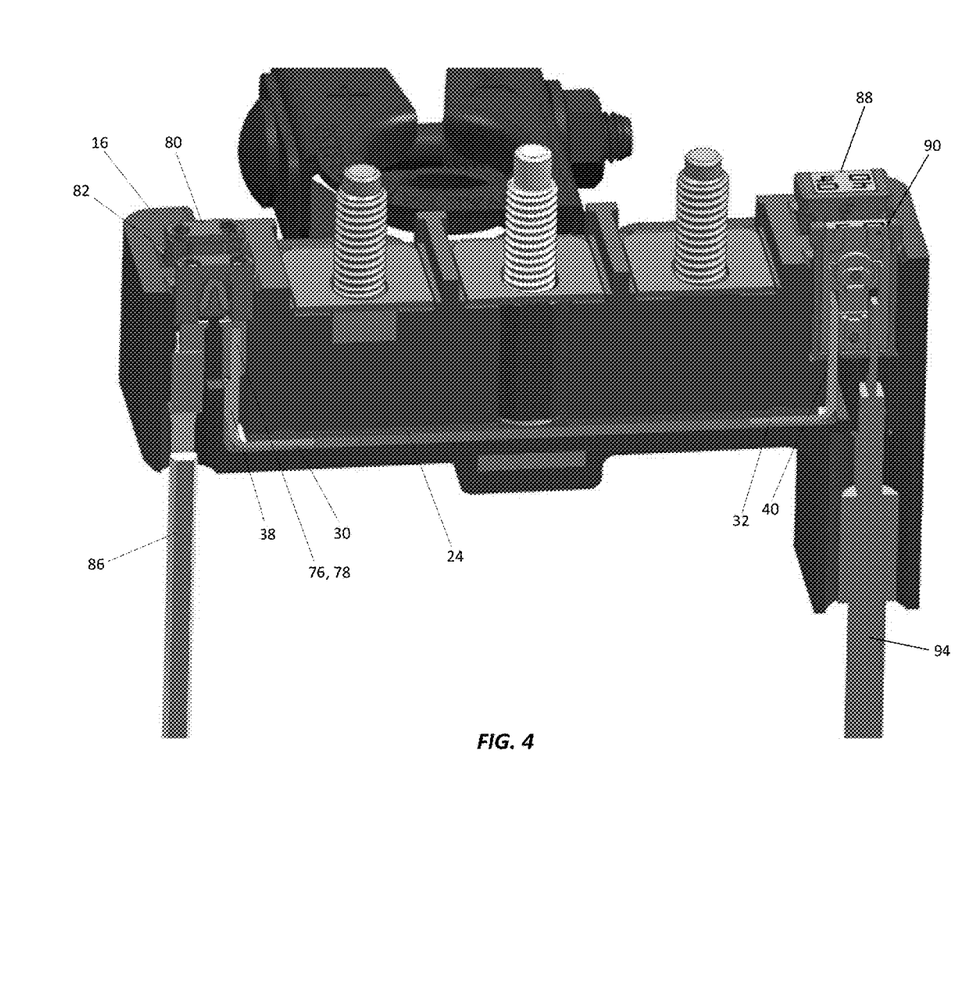
FIG. 4 is longitudinal cross-sectional view illustrating the fuse assembly shown in FIG. 2.

Referring now to FIG. 4, the bus extensions 30, 32 may facilitate the connection of fuses having low-medium amperage ratings (e.g., 5-40 amps) to the fuse assembly 14. For example, the terminal portion 38 of the bus extension 30 may have forked terminals 76, 78 (best shown in FIG. 2) for receiving legs of respective blade fuses 80, 82. The blade fuses 80, 82 may be seated within respective recesses formed in the mounting cradle 16 and mounting block 22 and may be connected to respective electrical conductors 84, 86 (see also FIG. 1) that extend through apertures in the bottom of the mounting cradle 16.

The top edge of the terminal portion 40 of the bus extension 32 may facilitate connection to slotted cartridge fuses 88, 90 which may be seated within respective recesses formed in the mounting cradle 16 and mounting block 22 and may be and connected to respective electrical conductors 92, 94 (see also FIG. 1) that extend through apertures in the bottom of the mounting cradle 16. As described above, the reduced thickness of the bus extension 32 relative to the bus bar 24 allows a conventional slotted cartridge fuse adapted for connection to a 0.8 millimeter terminal to be connected to the fuse assembly 14, for example.

Figure 5:
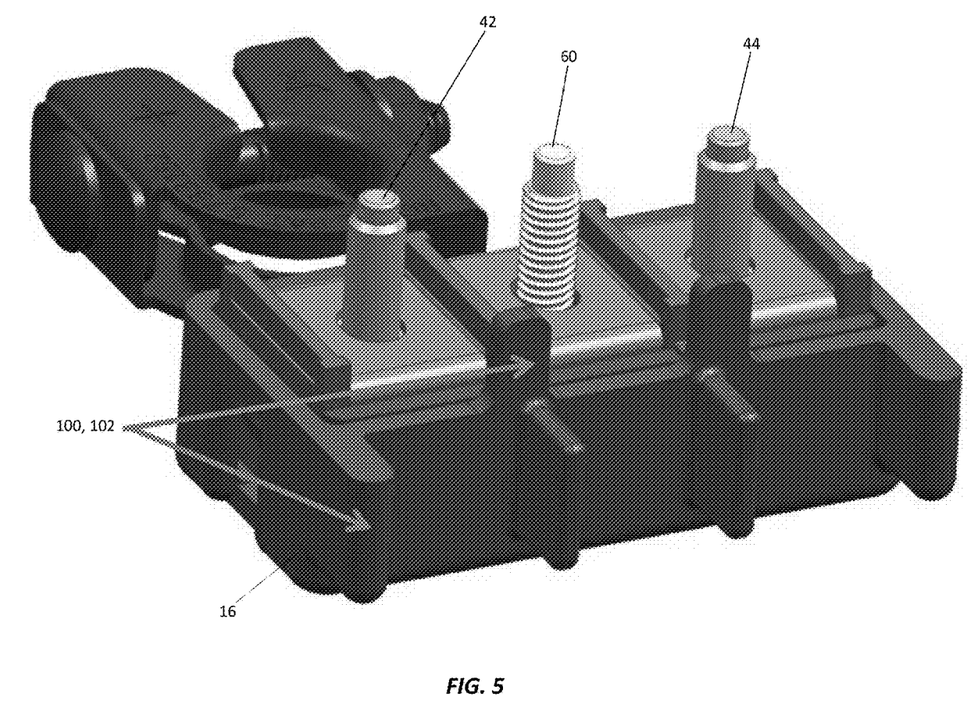
FIG. 5 is perspective view illustrating an alternative embodiment of a fuse module in accordance with the present disclosure.
Figure 6:
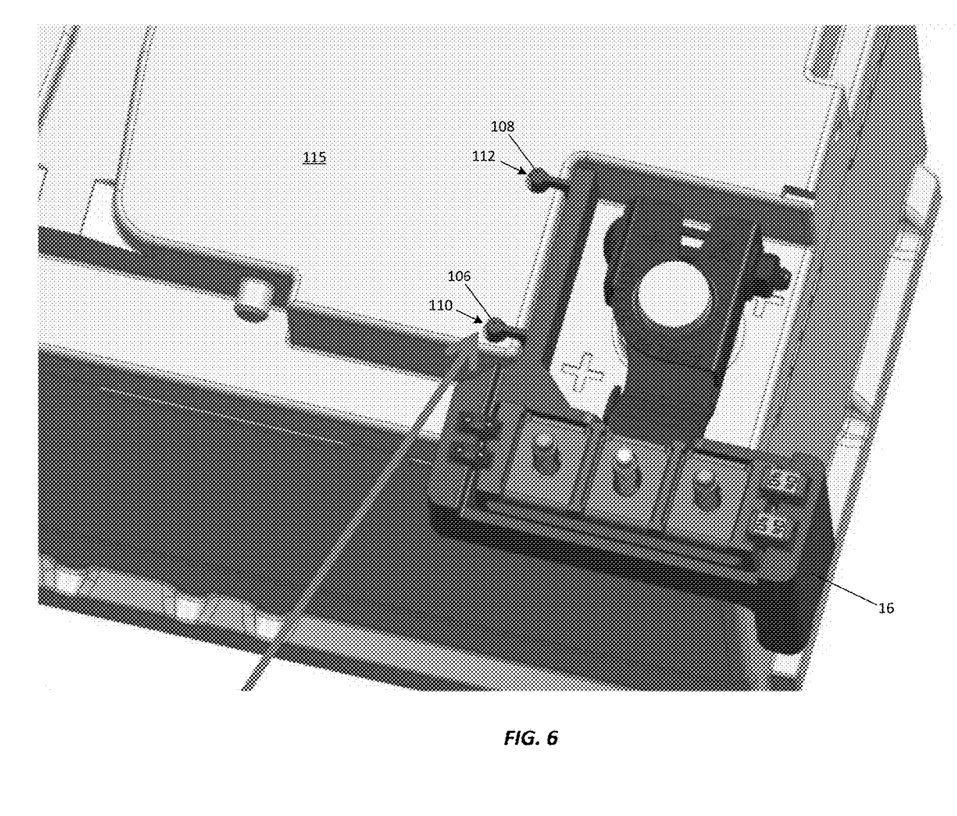
FIG. 6 is perspective view illustrating another alternative embodiment of a fuse module in accordance with the present disclosure.

It is contemplated that the mounting cradle 16 of the fuse module 10 may be provided with numerous features for accommodating various application environments. For example, referring to FIG. 5, which depicts an embodiment of the fuse module 10 with the bus extensions 30, 32 and accompanying structures/features omitted, it is contemplated that the mounting cradle 16 may be provided with ridges 100, castellations 102, and/or other surface features for routing flexible conductors (not shown) to the terminals posts 42, 44 and to the mounting post 60 in a desired manner. Referring to another example shown in FIG. 6, it is contemplated that the mounting cradle 16 may be provided with a stabilizing arm 104 extending therefrom, the stabilizing arm 104 having detents 106, 108 adapted to fit within keyhole-shaped recesses 110, 112 in a battery case 115 for preventing rotation of the fuse module 10 and for providing the fuse module 10 with mechanical strain relief.

It will be appreciated by those of ordinary skill in the art that the fuse module 10 of the present disclosure provides numerous advantages relative to pre-fuse boxes that are currently available on the market. For example, owing to the configuration of the above-described mounting cradle 16, with the mounting post 60 extending through, and integral with, the fuse assembly 14, the entire fuse module 10 can be mounted directly to a positive terminal of an automobile battery in close proximity thereto without any flexible conductors extending therebetween. This provides a significant space and material savings relative to conventional pre-fuse boxes. Additionally, the bus extensions 30, 32, which are mechanically joined directly to the bus bar 24, facilitate the provision of terminals with proper mechanical and material characteristics for accommodating low-medium-current fuses in compact configuration.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure makes reference to certain embodiments, numerous modifications, alterations and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof.

The invention claimed is:

1. A fuse module comprising:
    an electrically conductive battery clamp adapted for connection to a battery terminal;
    a fuse assembly comprising:
        a mounting block formed of an electrically insulating material;
        an electrically conductive bus bar disposed on a first side of the mounting block in contact with the battery clamp;
        a plurality of fuse terminals disposed on a second side of the mounting block opposite the first side and connected to the bus bar by respective fusible elements; and
        an electrically conductive terminal post extending through one of the fuse terminals for facilitating connection to a first electrical component; and
    a mounting cradle holding the fuse assembly and at least a portion of the battery clamp, the mounting cradle including a mounting post extending through the battery clamp, the bus bar, the mounting block, and one of the fuse terminals for facilitating connection to a second electrical component and for securing the battery clamp, the fuse assembly, and the mounting cradle together in a stacked arrangement, wherein the mounting post is surrounded by a tubular sleeve that extends between the bus bar and the fuse terminal through which the mounting post extends.

2. The fuse module of claim 1, wherein the tubular sleeve is formed of an electrically conductive material and provides an electrically conductive path between the bus bar and the fuse terminal through which the mounting post extends.

3. The fuse module of claim 1, wherein the tubular sleeve is formed of an electrically insulating material.

4. The fuse module of claim 1, further comprising an electrically conductive bus extension extending from the bus bar for facilitating connection to a fuse.

5. The fuse module of claim 4, wherein the bus extension is a first bus extension extending from a first end of the bus bar, and wherein the fuse assembly further includes an electrically conductive second bus extension extending from a second end of the bus bar for facilitating connection to another fuse.

6. The fuse module of claim 4, wherein the bus extension is forked for receiving a blade fuse.

7. The fuse module of claim 4, wherein the bus extension defines a flat edge adapted to receive a slotted fuse.

8. The fuse module of claim 4, wherein the bus extension differs from the bus bar with respect to at least one of material and thickness such that the bus extension has a lower current carrying capacity than the bus bar.

9. The fuse module of claim 1, wherein at least one of the mounting block and the mounting cradle define a recess for holding a fuse.

10. The fuse module of claim 9, wherein adjacent portions the mounting block and the mounting cradle together define the recess.

11. The fuse module of claim 1, further including a stabilizing arm extending from the mounting cradle, the stabilizing arm adapted to engage a battery to which the fuse module is connected and to prevent rotation of the fuse module relative to the battery.

12. The fuse module of claim 11, wherein the stabilizing arm includes a protrusion adapted to fit within a complimentary recess in a battery case.

13. A fuse module comprising:
    an electrically conductive battery clamp having a ferrule portion adapted for connection to a battery terminal and further having a terminal portion extending from the ferrule portion;
    a fuse assembly comprising:
        a mounting block formed of an electrically insulating material;
        an electrically conductive bus bar disposed on a first side of the mounting block in contact with the terminal portion of the battery clamp;
        a plurality of fuse terminals disposed on a second side of the mounting block opposite the first side and connected to the bus bar by respective fusible elements extending along a third side of the mounting block;
        an electrically conductive terminal post extending through one of the fuse terminals for facilitating connection to a first electrical component; and
        an electrically conductive bus extension mechanically joined to the bus bar for facilitating connection to a fuse, wherein the bus extension differs from the bus bar with respect to at least one of material and thickness; and
    a mounting cradle holding the terminal portion of the battery clamp and the fuse assembly, the mounting cradle including a mounting post extending through the terminal portion of the battery clamp, the bus bar, the mounting block, and one of the fuse terminals for facilitating connection to a second electrical component and for securing the battery clamp, the fuse assembly, and the mounting cradle together in a stacked arrangement, wherein the mounting post is surrounded by a tubular sleeve that extends between the bus bar and with the fuse terminal through which the mounting post extends.

14. The fuse module of claim 13, wherein the tubular sleeve is formed of an electrically conductive material and provides an electrically conductive path between the bus bar and the fuse terminal through which the mounting post extends.

15. The fuse module of claim 13, wherein the tubular sleeve is formed of an electrically insulating material.

16. The fuse module of claim 13, wherein the bus extension is a first bus extension extending from a first end of the bus bar, and wherein the fuse assembly further includes an electrically conductive second bus extension extending from a second end of the bus bar for facilitating connection to another fuse.

17. The fuse module of claim 13, wherein the bus extension is forked for receiving a blade fuse.

18. The fuse module of claim 13, wherein the bus extension defines an edge adapted to receive a slotted fuse.

19. The fuse module of claim 13, wherein the bus extension has a lower current carrying capacity than the bus bar.

20. The fuse module of claim 13, wherein at least one of the mounting block and the mounting cradle define a recess for holding the fuse.

* * * * *